United States Patent [19]

Corrales

[11] Patent Number: 5,779,320
[45] Date of Patent: Jul. 14, 1998

[54] PROTECTIVE CHILD RESTRAINT DEVICE FOR USE ON AN AUTOMOTIVE VEHICLE SEAT

[76] Inventor: Daniel S. Corrales, 1541 W. 132nd St., Gardena, Calif. 90249

[21] Appl. No.: 841,046

[22] Filed: Apr. 29, 1997

[51] Int. Cl.[6] .......................... A47C 31/00; A47C 7/00
[52] U.S. Cl. ........................ 297/487; 297/440.1
[58] Field of Search .................. 297/250.1, 256.15, 297/464, 487, 488, 253, 254, 255, 440.1

[56] References Cited

U.S. PATENT DOCUMENTS

| | | | |
|---|---|---|---|
| 2,796,915 | 6/1957 | Fox | 297/253 |
| 3,232,665 | 2/1966 | Von Wimmersperg | 297/385 |
| 3,424,497 | 1/1969 | Brilmyer et al. | 297/390 |
| 3,606,457 | 9/1971 | Reay | 297/390 |
| 3,819,230 | 6/1974 | Bloom | 297/250 |
| 3,865,433 | 2/1975 | Stafford | 297/390 |
| 3,964,787 | 6/1976 | Labadie et al. | 297/390 |
| 4,033,623 | 7/1977 | Thary et al. | 297/390 |
| 4,155,591 | 5/1979 | Mauron | 297/216 |
| 4,159,127 | 6/1979 | Czernakowski et al. | 297/487 X |
| 4,190,288 | 2/1980 | Korger | 297/488 |
| 4,671,574 | 6/1987 | Kassai | 297/487 |
| 4,685,688 | 8/1987 | Edwards | 297/487 X |
| 5,487,588 | 1/1996 | Burleigh et al. | 297/253 |
| 5,507,558 | 4/1996 | Kain | 297/256.15 |
| 5,599,060 | 2/1997 | Stephens et al. | 297/488 X |
| 5,669,663 | 9/1997 | Feuerherdt | 297/253 |

FOREIGN PATENT DOCUMENTS

| | | | |
|---|---|---|---|
| 2351821 | 5/1976 | France | 297/488 |
| 2389516 | 1/1979 | France | 297/487 |

*Primary Examiner*—Milton Nelson, Jr.
*Attorney, Agent, or Firm*—Konneker & Smith, P.C.

[57] ABSTRACT

A protective child restraint device for use on an automotive vehicle seat has a spaced pair of opposite vertical side panels adapted to rest directly on the bottom side of the vehicle seat on opposite sides of a child sitting directly on the vehicle seat, and a generally cylindrical spacer member extending between and releasably secured to opposite top front corner portions of the side panels. Front edge portions of the side panels have specially designed, generally L-shaped slots formed therein for securely receiving and retaining one of the vehicle's seat belts, and rear bottom corners of the side panels have rearwardly extending, generally triangularly shaped projections thereon which are receivable between the bottom of the vehicle seat back and the bottom side portion of the seat to thereby stabilize the child restraint device against forward tipping. In a first alternate embodiment of the restraint device, the spacer member is replaced with a generally rectangular shield member that protects the child from a deploying passenger side air bag when the restraint device is used on the passenger side of the vehicle's front seat. In a second alternate embodiment of the restraint device, adjustable bracing bars are connected to opposite sides of the top end of the shield member and extend to the vehicle seat backrest portion to substantially prevent rearward deflection of the shield member in the event that it is struck by a deploying passenger side air bag.

16 Claims, 3 Drawing Sheets

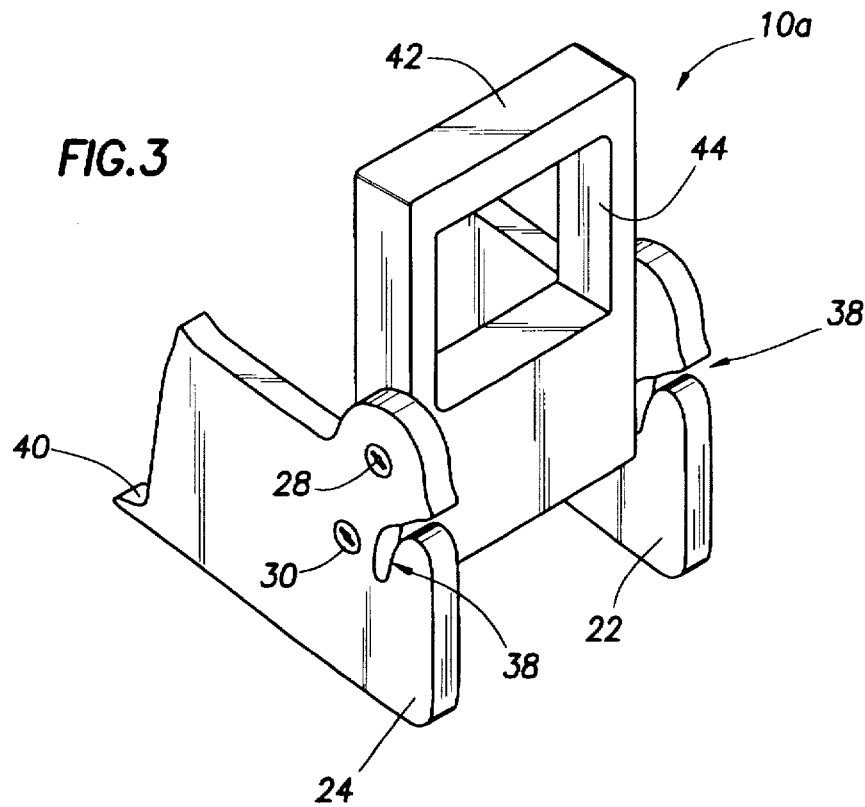

5,779,320

PROTECTIVE CHILD RESTRAINT DEVICE FOR USE ON AN AUTOMOTIVE VEHICLE SEAT

BACKGROUND OF THE INVENTION

The present invention generally relates to safety devices for children sitting in automotive vehicles such as cars and trucks and, in a preferred embodiment thereof, more particularly provides a specially designed protective child restraint device for use in conjunction with an automotive vehicle seat belt.

Various types of car seats and other devices have been previously utilized in conjunction with a seat belt to support a child in a seated position on the front or back seat of an automotive vehicle such as a car and prevent the child from being thrown from the seat in the event of a collision of the vehicle in which the child is riding. As is well known, conventional car seats and other devices which may be connected to an existing automotive seat belt often have various problems, limitations and disadvantages associated therewith such as, for example, being relatively expensive, bulky and somewhat heavy and therefore often inconvenient to carry from place to place, difficult and awkward to install in and remove from the vehicle, and oftentimes difficult to place the child in and remove the child from. Additionally, some types of car seats may undesirably display a tendency to tip forwardly in the event of a collision.

With the advent of passenger side front seat air bags, conventional car seats and other child restraint devices also pose another potential problem—namely, exposing the child to possible injury from the deployed passenger side air bag when the child is seated in the passenger side of the front seat of the vehicle. While for adults riding on the passenger side of the front seat, the passenger side air bag is often a life saving device, its force when deployed can and has posed a hazard for infants and small children exposed to its explosively generated deployment force.

The result of this has been that various safety agencies and car manufacturers now recommend against placing a child's car seat in the front seat of a vehicle equipped with a passenger side air bag, and recommend instead the placement of the car seat in the back seat of the vehicle to isolate the child from the potentially dangerous forces of the passenger side air bag. While the placement of the car seat in the back seat of the vehicle is desirable from a safety standpoint when the vehicle is equipped with a passenger side air bag, it is also inconvenient and often quite undesirable for the driver because of his or her inability to quickly reach the child and also the increased difficulty in monitoring the child's activities.

As can be readily seen, it would be highly desirable to provide an improved protective child restraint device for use on an automotive vehicle seat which eliminates or at least substantially reduces the above-mentioned problems, limitations and disadvantages often associated with car seats and other restraint devices of conventional construction. It is accordingly an object of the present invention to provide such an improved protective child restraint device.

SUMMARY OF THE INVENTION

In carrying out principles of the present invention, in accordance with a preferred embodiment thereof, an improved protective device is provided for use in restraining a child sitting on the bottom portion of an automotive vehicle seat having a seat belt secured thereto and a backrest portion extending upwardly from and generally transverse to the bottom portion.

The protective device comprises first and second side panel members disposed in a mutually spaced, parallel and opposing relationship. The first and second panel members are positionable atop and transverse to the bottom portion of the vehicle seat on opposite sides of a child sitting thereon and have top front corner portions and front side edge portions. A third member extends between and removably interconnects the top front corner portions of the first and second panel members and is positioned to extend over the legs of a child seated between the first and second side panel members. Seat belt receiving means are provided on the side panel members for removably receiving the seat belt in a manner restraining the protective device, and thus the child, on the vehicle seat.

According to one feature of the invention, the seat belt receiving means include a pair of generally L-shaped slots formed in the front side edge portions of the first and second side panel members, with each slot having a front portion extending generally rearwardly into the associated panel front side edge portion and having an inner end, and a rear portion extending downwardly from the inner end of the front slot portion. Representatively, the front slot portions are forwardly and upwardly sloped, and the rear slot portions have vertical lengths generally equal to the width of the seat belt. To removably secure the protective device to the vehicle seat, the seat belt is moved rearwardly through the front slot portions and then downwardly into their rear portions, buckled, and then appropriately tightened. The generally L-shaped configurations of these slots substantially prevents the tightened seat belt from coming out of the slots.

According to another feature of the invention, bottom rear corner portions of the first and second panel members have rearwardly extending stabilizing projections disposed thereon. The projections representatively have generally triangular configurations, and are operative to be inserted between the seat backrest and bottom portions to stabilize the protective against forwardly tipping in the event of a sudden deceleration of the vehicle or a forward collision thereof with another vehicle or object.

In one embodiment of the protective device the third member which extends between and interconnects the first and second side panel members has a generally cylindrical configuration, and the protective device is adapted for use in the rear seat of a vehicle or the front seat of a vehicle which is not provided with a passenger side air bag.

In a second embodiment of the protective device, adapted for use in the front seat of a vehicle having a passenger side air bag, the third member is a vertically elongated shield member having a bottom portion removably interconnected between the top front corner portions of the first and second side panel members, and an upper end portion that extends upwardly in front of the face of the restrained child and serves to shield the child from the potentially injurious forces of a deploying air bag positioned in front of the protective device. Representatively, the shield member may have a small viewing window cutout area formed therein, and is slightly tilted in a forward and upward direction.

In a third embodiment of the protective device, also adapted for use in the front seat of a vehicle having a passenger side air bag, a pair of horizontally oriented elongated bracing members have front end portions anchored to the upper portion of the shield member, and rear end portions positionable against the front side of the seat backrest portion to thereby impede rearward tipping of the protective device when it is struck by a deploying passenger side air bag. In accordance with another feature of the invention, the bracing members are secured to the upper shield member portion in a manner permitting the bracing members to be adjusted in front-to-rear directions relative thereto to accommodate differences in the backrest angles of various vehicle seats on which the protective device may be secured.

BRIEF DESCRIPTION OF THE DRAWINGS

FIG. 3 is a perspective view of a first alternate embodiment of the child-protective restraint device as modified for use on the front seat of automotive vehicle equipped with a passenger side air bag;

FIG. 4 is an enlarged scale right side elevational view of a second alternate embodiment of the child-protective restraint device, also useable on the front seat of an automotive vehicle equipped with a passenger side air bag;

DETAILED DESCRIPTION

Figure 1:
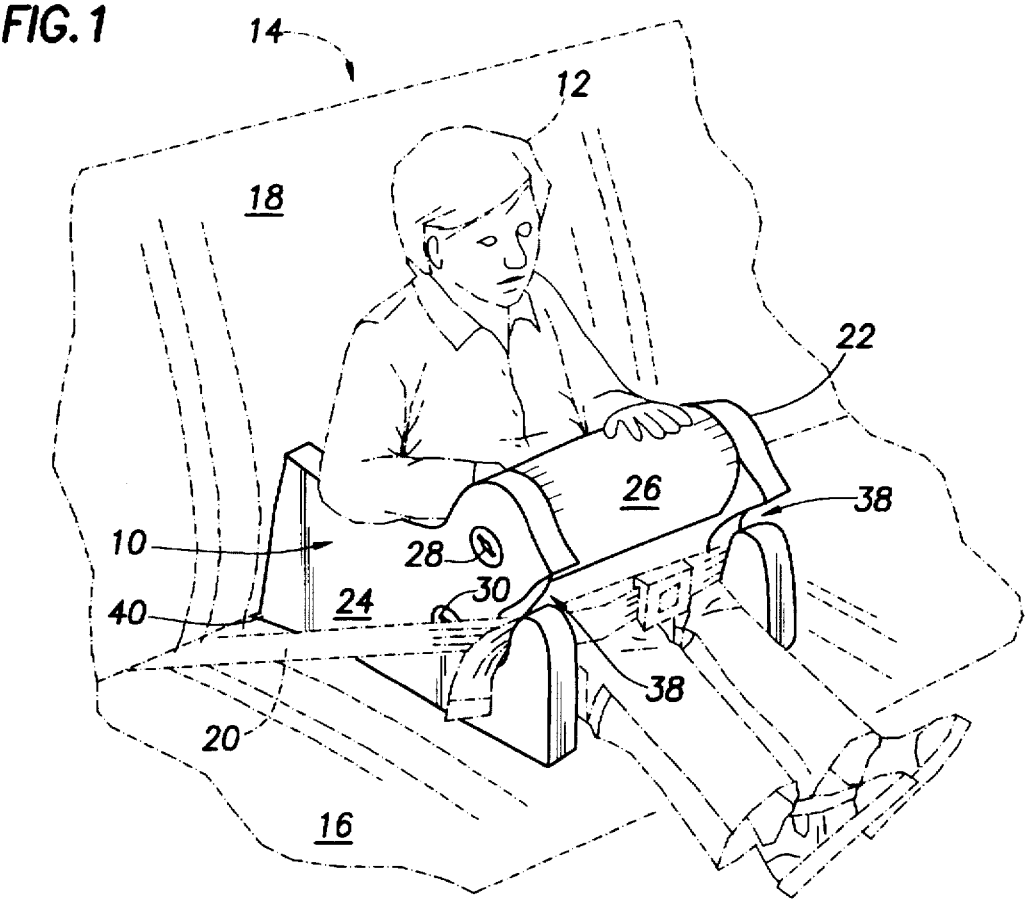
FIG. 1 is a perspective view of a child-protective restraint device which embodies principles of the present invention and is being representatively used by a child in the back seat of a car.
Figure 2:
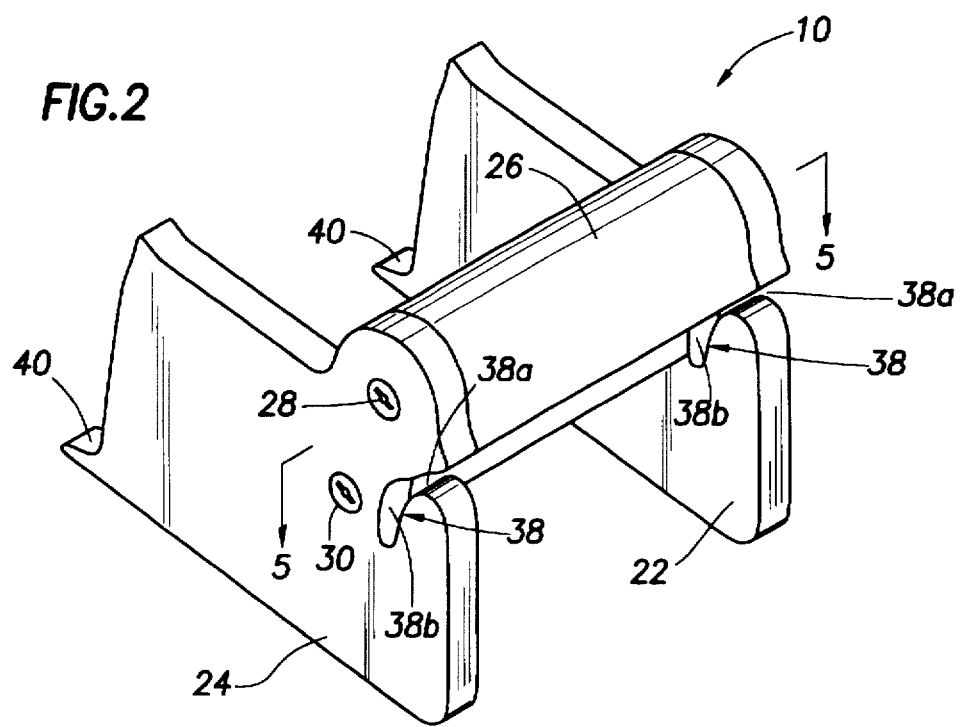
FIG. 2 an enlarged perspective view of the child-protective restraint device removed from the car and illustrating in more detail the simple and inexpensive configuration of the device.
Figure 5:
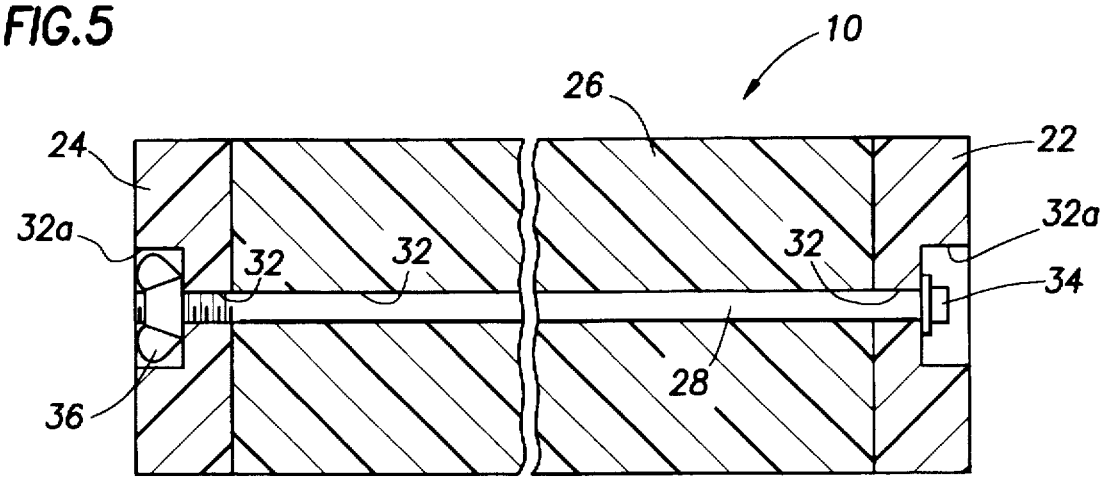
FIG. 5 is an enlarged scale cross-sectional view taken through the first device embodiment along line 5—5 of FIG. 2.

Referring initially to FIGS. 1, 2 and 5, in a first preferred embodiment thereof, the present invention provides a specially designed child-restraint protective apparatus 10 used to safely hold a child 12 in an automotive vehicle seat 14, having a bottom portion 16 and a backrest portion 18, using an existing seat belt 20. The automotive vehicle seat 14 is representatively the rear seat of a car, or the front seat of a car or truck which is not provided with a passenger side air bag.

Child-restraint protective apparatus 10 is of an extremely simple construction and comprises a pair of spaced apart, facing, parallel left and right side panels 22 and 24, and a generally cylindrical spacer member 26 secured to and extending between opposing top front corner portions of the side panels 22,24 by top and bottom horizontal metal rods 28,30 (the top metal rod 28 being shown in FIG. 5). Metal rods 28,30 pass through aligned openings 32 in the side panels 22,24 and the spacer member 26, with the openings 32 in the side panels 22,24 having countersunk outer side portions 32a as best illustrated in FIG. 5. Each rod 28,30 is removably retained in the openings 32, thereby permitting the protective apparatus 10 to be easily and quickly disassembled, by means of friction caps 34 locked on the rod ends received in the countersunk opening areas 32a in the side panel 22, and thumbscrews 36 received in the countersunk opening areas 32a in the side panel 24.

Side panels 22,24 and the spacer member 26 are preferably formed from a high strength, inexpensive molded plastic material such as molded polypropylene, and the side panels 22,24 are representatively configured in the general shape of an animal (such as the illustrated chick) to the make the protective restraint apparatus more appealing to a small child. Since there are only three primary pieces in the protective restraint apparatus 10, it is essentially open along its top and bottom, and front and back sides.

According to a feature of the invention, generally L-shaped seat belt-receiving slots 38 are formed in front side edge portions of the side panels 22 and 24, with the slots 38 having an upwardly and forwardly sloped entrance portions 38a extending outwardly through the front side edges of the side panels 22 and 24, and generally vertically oriented downturned inner end portions 38b having vertical lengths generally equal to the width of the seat belt 20. In accordance with another aspect of the invention, each of the side panels 22 and 24 has, at a rear bottom corner thereof, a rearwardly extending, generally triangular stabilizing projection 40.

In contrast to the difficulty and awkwardness often encountered in placing a child in a conventional elevated car seat, the child 12 is very easily and quickly positioned in the protective restraint apparatus 10 by sitting the child on the seat portion 16, placing the apparatus 10 downwardly over the child's lap, sliding the apparatus rearwardly along the seat portion 16 until it abuts the seat back 18 and the stabilizing projections 40 are wedged between the bottom side of the seat backrest portion 18 and the seat bottom portion 16 (see FIGS. 1 and 4), placing the seat belt 20 in the side panel slots 38, and then buckling the seat belt 20 as shown in FIG. 1.

The projections 40 that are wedged in the juncture area between the bottom and backrest portions 16,18 of the seat 14 serve to stabilize the apparatus 10 against tipping forwardly over the seat belt 20 in the event that the vehicle suddenly decelerates or strikes another vehicle from behind. Additionally, the specially configured side panel slots 38 serve to substantially prevent the buckled seat belt 20 from somehow working its way out of the slots and thereby out of operative restraint engagement with the protective apparatus 10.

A first alternate embodiment 10a of the previously described child-protective restraint apparatus is perspectively illustrated in FIG. 3 and is designed for use on the passenger side of a front seat of an automotive vehicle provided with a passenger side air bag. The apparatus 10a is identical to the apparatus 10 with the exception that the generally cylindrical spacer member 26 in the apparatus 10 is replaced with a vertically elongated, generally rectangular air bag shield member 42.

Like the spacer member 26 which it replaces, the member 42 is also preferably formed from a molded polypropylene material. Shield member 42 has a bottom end portion that is disposed between and releasably interconnects the side panels 22 and 24 by means of the previously described top and bottom metal rods 28 and 30, and has a forwardly tilted upper portion that extends upwardly in front of the face and upper body portion of a child using the protective restraint device 10a to thereby shield the seated child from the potentially injurious forces of a deploying front seat passenger side air bag. The shield member 42 may, as depicted in FIG. 3, have a viewing window cutout area 44, or may be of a solid construction to provide even more air bag deployment protection. Apparatus 10a is secured to the vehicle seat, and a child is placed in the apparatus 10a, in the same manners as previously described in conjunction with the child-protective restraint apparatus 10.

Figure 6:
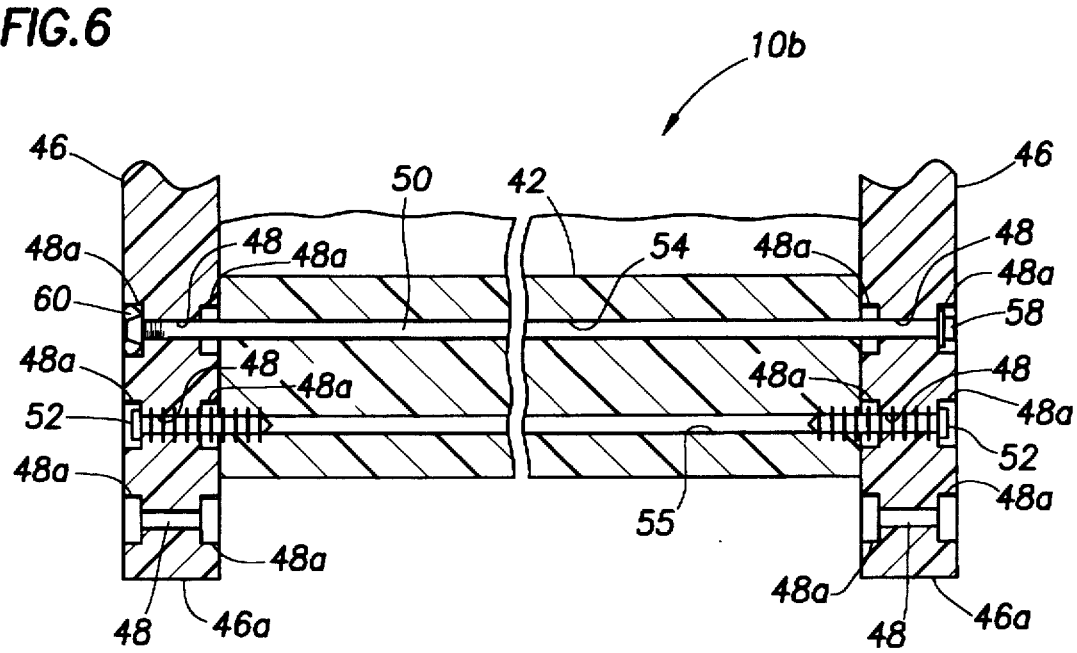
FIG. 6 is an enlarged scale cross-sectional view taken through the third device embodiment along line 6—6 of FIG. 4.

Illustrated in FIGS. 4 and 6 is a second alternate embodiment 10b of the previously described child-protective restraint apparatus 10. Apparatus 10b is identical to apparatus 10a with the exception that a pair of adjustable molded polypropylene bracing bars 46 are added to the apparatus 10b. Each of the bracing bars 46 has an elongated, generally rectangular configuration, a front end portion 46a with three longitudinally spaced circular openings 48 extending therethrough and having countersunk portions 48a at each end thereof, and a transversely enlarged rear end portion 46b.

Bracing bars 46 longitudinally extend horizontally between an upper end portion of the shield member 42 and the front side of the vehicle seat backrest portion 18 and serve to brace the shield member 42 against rearward deflection by a deploying passenger side air bag striking the front side of the shield member 42. Front end portions of the bracing bars 42 are adjustably and removably secured to opposite side edge portions of the top end of the shield member 42 by means of a metal rod member 50 and a pair of removable ridged plastic press fittings 52.

To install the bracing bars 46 in their solid line position shown in FIG. 4, the rearwardmost pair of bar holes 48 are aligned with two circular openings 54,55 (see FIG. 6) extending through a top end portion of the shield member 42. The metal rod 50, with a friction cap 58 installed on one end thereof, is inserted through the rearwardmost bar openings 48 and the shield member opening 54, and a thumbscrew 60 is installed on the other rod end within the countersunk bar opening portion 48a indicated in FIG. 6. As will be appreciated, by placing the countersunk opening portions 48a on both sides of the bracing bars 46, the bars are made conveniently reversible in a left-to-right sense relative to the shield member 42. To further releasably secure the bars 46 to the shield member 42, the plastic press fittings 52 are pressed through the middle bar openings 48 and into opposite ends of the shield member opening 55.

In the event, for instance, that the seat backrest portion 18 is more rearwardly inclined (as indicated by the dotted line position of backrest portion 18 shown in FIG. 4), the bracing bars 46 may be rearwardly adjusted to their indicated dotted line positions to compensate for this increased rearward inclination simply by fastening the front ends 46a of the bracing bars 46 to the upper end of the shield member 42 using the forwardmost pair of bar openings 48 in conjunction with the metal rod 50 and the plastic press fittings 52.

As can be readily seen from the foregoing, the child-protective restraint apparatus of the present invention, in each of its representatively illustrated preferred embodiments, provides an easy to use, child-friendly, relatively inexpensive device for protecting a child sitting in an automotive vehicle seat. Such device has improved stability, seat belt attachability, and, in its embodiments 10a and 10b, also has substantially improved protection from passenger side air bag deployment forces. The device, as compared to conventional elevated car seats, places the child directly on the vehicle seat, thereby advantageously lowering his center of gravity relative to the seat bottom and making it easier to place the child in the restraint device.

As can also be seen, since the apparatus is designed to be easily and quickly disassembled and reassembled, it can be readily be converted among its three illustrated embodiments to ready it for use in a back vehicle seat, a front vehicle seat when there is no passenger side air bag, or a front vehicle seat when there is a passenger side air bag.

The foregoing detailed description is to be clearly understood as being given by way of illustration and example only, the spirit and scope of the present invention being limited solely by the appended claims.

What is claimed is:

1. A protective device for use in restraining a child sitting on a bottom portion of an automotive vehicle seat having a seat belt secured thereto and a backrest portion extending upwardly from and generally transverse to said bottom portion, said device comprising:

first and second side panel members disposed in a mutually spaced, parallel and opposing relationship, said first and second side panel members being positionable atop and transverse to said bottom portion of said automotive vehicle seat on opposite sides of a child sitting thereon, said first and second side panel members having top front corner portions and front side edge portions;

a third member extending between and interconnecting said top front corner portions and positioned to extend over the legs of a child seated between said first and second side panel members; and a pair of generally L-shaped seat belt-receiving slots formed in said front side edge portions, each of said seat belt-receiving slots having a front portion extending rearwardly through one of said front side edge portions and having an inner end, and a rear portion extending downwardly from the inner end of the front slot portion and having a vertical length, said seat belt-receiving slots being configured to permit the seat belt to be moved rearwardly through their front portions and then be moved downwardly into their rear portions to be restrained therein.

2. The protective device of claim 1 wherein said front portions of said seat belt-receiving slots are sloped forwardly and upwardly.

3. The protective device of claim 1 wherein the vertical lengths of said rear portions of said seat belt-receiving slots are generally equal to the width of the seat belt.

4. The protective device of claim 1 wherein said third member has a generally cylindrical configuration.

5. The protective device of claim 1 wherein said third member and said first and second side panel members are removably joined together.

6. The protective device of claim 1 wherein said third member and said first and second side panel members are removably joined together by spaced apart first and second rod members extending horizontally therethrough transversely to said first and second side panel members.

7. The protective device of claim 1 further comprising rearwardly extending stabilizing projections formed on bottom rear corner portions of said first and second side panel members and configured to be received between the bottom and backrest portions of the seat.

8. The protective device of claim 7 wherein said stabilizing projections have generally triangular configurations.

9. A protective device for use in restraining a child sitting on a bottom portion of an automotive vehicle seat having a seat belt secured thereto and a backrest portion extending upwardly from and generally transverse to said bottom portion, said device comprising:

first and second side panel members disposed in a mutually spaced, parallel and opposing relationship, said first and second side panel members being positionable atop and transverse to said bottom portion of said automotive vehicle seat on opposite sides of a child sitting thereon, said first and second side panel members having top front corner portions and front side edge portions;

a shield member having a lower portion extending between and interconnecting said top front corner portions and positioned to extend over the legs of a child seated between said first and second side panel members, said shield member further having an upper portion extending above said top front corner portions in front of the child's face, said shield member being operative to shield the child from a deploying air bag positioned in front of said protective device, said shield member further having a viewing window cutout area formed therein; and means associated with said first and second side panel members for removably securing the seat belt thereto.

10. The protective device of claim 9 wherein said shield member tilts forwardly and upwardly relative to said first and second side panel members.

11. The protective device of claim 9 wherein said shield member is removably secured to said first and second side panel members.

12. The protective device of claim 9 wherein said shield member has a generally rectangular configuration.

13. The protective device of claim 9 wherein said shield member is removably secured to said first and second side panel members by spaced apart first and second parallel rod members extending horizontally through said first and second side panel members and said lower portion of said shield member.

14. A protective device for use in restraining a child sitting on a bottom portion of an automotive vehicle seat having a seat belt secured thereto and a backrest portion extending upwardly from and generally transverse to said bottom portion, said device comprising:

first and second side panel members disposed in a mutually spaced, parallel and opposing relationship, said first and second side panel members being positionable atop and transverse to said bottom portion of said automotive vehicle seat on opposite sides of a child sitting thereon, said first and second side panel members having top front corner portions and front side edge portions;

a shield member having a lower portion extending between and interconnecting said top front corner portions and positioned to extend over the legs of a child seated between said first and second side panel members, said shield member further having an upper portion extending above said top front corner portions in front of the child's face, said shield member being operative to shield the child from a deploying air bag positioned in front of said protective device;

first and second generally horizontally oriented elongated bracing members having front end portions secured to said upper portion of said shield member, and rear end portions positionable against the front side of the backrest portion of the seat; and means associated with said first and second side panel members for removably securing the seat belt thereto.

15. The protective device of claim 14 wherein said front end portions of said first and second bracing members are removably secured to said upper portion of said shield member.

16. The protective device of claim 14 wherein said first and second bracing members are adjustable in front-to-rear directions relative to said shield member.

* * * * *